May 2, 1967 S. Y. MERRITT 3,317,815
DRIVE SYSTEM FOR STATIC INVERTERS
Filed July 10, 1963 4 Sheets-Sheet 1

INVENTOR:
STANLEY Y. MERRITT
BY Isidore Match
ATTORNEY

INVENTOR:
STANLEY Y. MERRITT
BY Isidore Match
ATTORNEY

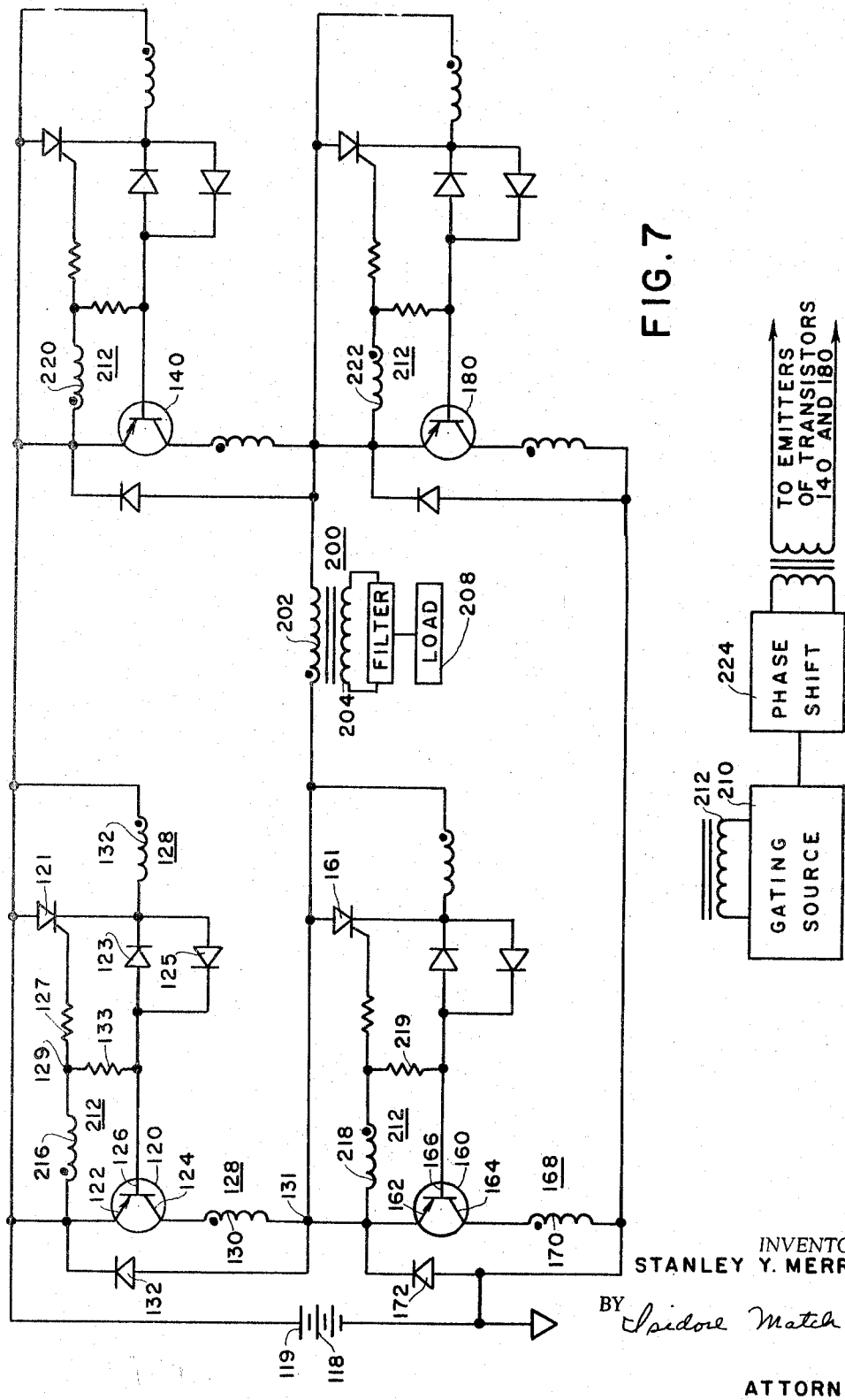

United States Patent Office 3,317,815
Patented May 2, 1967

3,317,815
DRIVE SYSTEM FOR STATIC INVERTERS
Stanley Y. Merritt, Waynesboro, Va., assignor to General Electric Company, a corporation of New York
Filed July 10, 1963, Ser. No. 293,936
12 Claims. (Cl. 321—45)

The invention relates to static inverters. More particularly, it relates to improved transistor static inverters embodying efficient drive arrangements therein.

In many situations, static inverters have to be operated from a unidirectional voltage which may vary over a wide range. For example, static inverters utilized in aircraft may have to operate from a unidirectional voltage which may vary from about 20 to more than 30 volts. Such inverters are also generally required to have sufficient overcurrent capability to provide fault isolation through the use of fuses. The overcurrent capability requirement may be as high as 200% of rated current.

Generally, heretofore, in such static inverters employing transistors as the power switching elements therein, the base drive for the transistors has been provided from a square wave voltage source through resistors. With this type of arrangement, quite commonly, the loss occasioned by the drive power for the transistors may be as much as ten to twelve percent of the output. In addition, other fundamentally necessary losses are present such as conduction loss, transformer loss, and the loss in the square wave voltage source. Consequently, although an efficiency figure of about 75% may be desired for a static inverter, it has been found as a practical matter that, in actuality, such desired figure can only be attained by severely compromising some other desirable quality in the inverter.

One important source of operating loss is the aforesaid employment of square wave base drive for the transistors through resistors. With such employment, sufficient base drive is supplied to produce peak collector current over the entire conduction period even though, in the final sinusoidal output of the inverter, such peak drive is needed only for an instant. Thus, excessive current is supplied throughout the whole conduction period of a transistor and the excess of the current used over that required still further increases with an increase in the voltage of the driving source. Also, because of the presence of the base resistors, the square wave driving source voltage has to be applied at a considerably higher level than the base voltage. Thus, it is readily appreciated that if the base of the power switching transistor in a static inverter were supplied only with the drive current actually required and if such current could effectively be supplied directly at the base voltage, the losses occasioned by base drive would be appreciably reduced.

Accordingly, it is an important object of this invention to provide an improved static inverter employing transistors as the power switching elements therein and wherein the drive current for the transistors substantially does not exceed the drive current actually required.

It is a further object to provide a static inverter in accordance with the preceding object capable of carrying both leading and lagging power factor loads.

It is another object to provide a bridge type static inverter in accordance with the preceding objects.

Generally speaking and in accordance with the invention, there is provided a static inverter employing transistors as the complementary power switching elements therein and having the windings of a current transformer in their drive input and in their output circuits. A square wave voltage source is included to provide initial drive to the transistors, the windings being so poled that the initiation of conduction in a transistor by such square wave drive causes a regenerative drive to be applied to the conducting transistor to effect substantially full conductivity therein. The inverter may include an output transformer and the current transformer windings may be chosen to have a turns ratio which is substantially equal to the desired current transfer ratio therebetween at the highest peak current.

The features of this invention which are believed to be new are set forth with particularity in the appended claims. The invention, itself, however, may best be understood by reference to the following description when taken in conjunction with the accompanying drawings which show embodiments of a static inverter according to the invention.

In the drawings, FIG. 1 is a schematic depiction of an illustrative embodiment of a static inverter constructed in accordance with the principles of the invention;

FIGS. 2A, 2B, 2C and 2D comprise a timing diagram of waveforms produced in the circuit of FIG. 1 with no load;

FIG. 7 is a schematic drawing of a bridge inverter constructed according to the invention.

Figure 1:
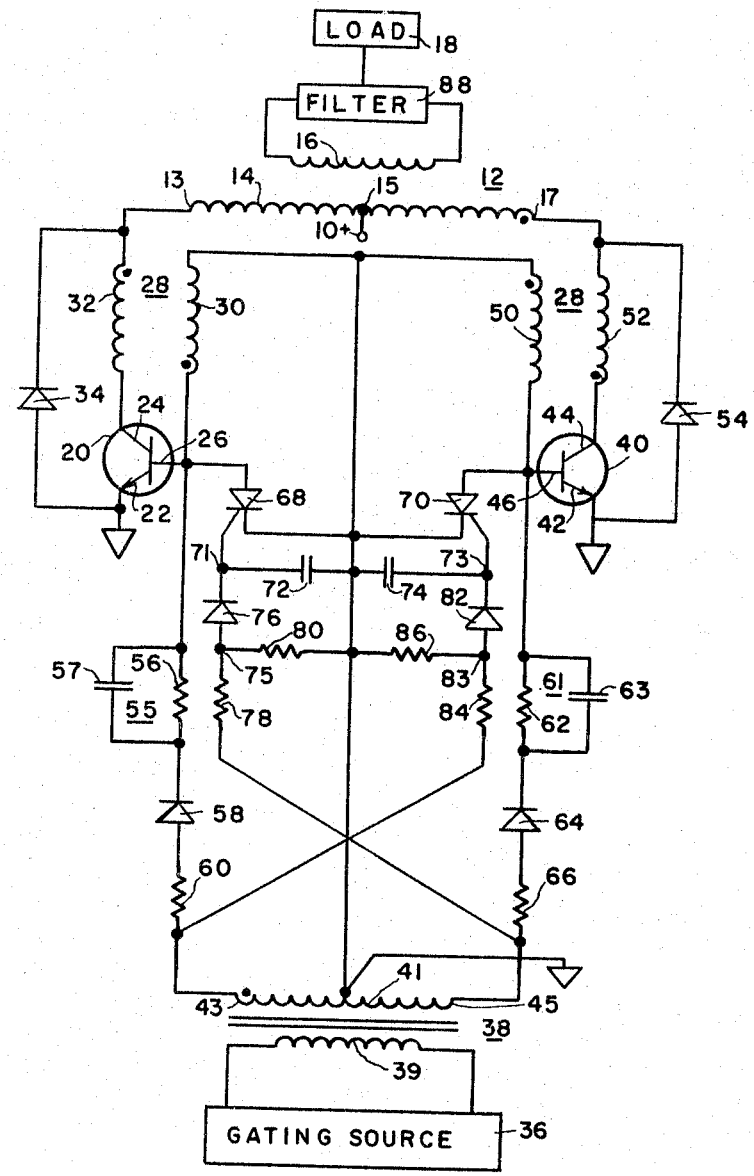

Referring now to FIG. 1, the unidirectional potential source (not shown) whose output is to be converted to an alternating current potential has its positive terminal 10 connected to the midpoint 15 of the primary winding 14 of an output transformer 12, a load 18 being connected across secondary winding 16.

The power switching elements in the circuit of FIG. 1 comprise transistors 20 and 40. Transistor 20 is connected in the common emitter configuration and has its emitter 22 directly connected to common, its collector 24 connected to terminal 13 of primary winding 14 through a winding 32 of a current transformer 28 and its base 26 connected to common through a winding 30 of current transformer 28. Base 26 is also connected to terminal 43 of the secondary winding 41 of the output transformer 38 of a gating source 36 through the series arrangement of the parallel combination 55 of a resistor 56 and a capacitor 57, the cathode to anode path of a diode 58 and a resistor 60. The cathode to anode path of a diode 34 is connected between terminal 13 of primary winding 14 and common, diode 34 being a so-called "pumpback" diode which enables the return of power to the source when load 18 is of the reactive type.

Similarly, transistor 40 has its emitter 42 directly connected to common, its collector 44 connected to terminal 17 of primary winding 14 through a winding 52 of current transformer 28 and its base 46 connected to common through a winding 50 of current transformer 28. Base 46 is also connected to terminal 45 of secondary winding 41 through the series arrangement of the parallel combination 61 of a resistor 62 shunted by a capacitor 63, the cathode to anode path of a diode 64 and a resistor 66. Silicon controlled rectifiers 68 and 70 have their respective anode to cathode paths connected between base 26 and common and base 46 and common. The gate electrodes of silicon controlled rectifiers 68 and 70 are respectively connected to common, through a pair of capacitors 72 and 74. The junction 71 of the gate electrode of silicon controlled rectifier 68 and capacitor 72 is connected to terminal 45 of secondary winding 41 through the cathode to anode path of a diode 76 and a resistor 78, the junction 75 of diode 76 and resistor 78 being connected to common through a resistor 80. The junction 73 of the gate electrode of silicon controlled rectifier 70 and capacitor 74 is connected to terminal 43 of secondary winding 41 through the cathode to anode path of a diode 82 and a resistor 84, the junction 83 of diode 82 and being connected to common through a resistor 86. Gating source 36 which preferably produces a rectangular wave output may suitably be a magnetic coupled multivibrator and provides base drive to transistors 20 and 40 through transformer 38.

In the operation of the circuit of FIG. 1, pairs of diodes 58, 64, and 76 and 82 function as half wave rectifiers, respectively for the drive inputs to transistors 20 and 40 and the gating inputs to silicon controlled rectifiers 68 and 70. Capacitors 57 and 63 insure sharp leading edges in the drive inputs to transistors 20 and 40 respectively. Capacitors 72 and 74 function as bypass capacitors. Resistors 56, 60, 62, 66, 78 and 84 serve as current limiting resistors and resistors 80 and 86 are utilized to develop the gating pulses for silicon controlled rectifiers 68 and 70.

In considering the operation of FIG. 1, let it be assumed that transistor 20 is rendered conductive whereby current flows through primary winding 14 from terminal 15 to 13, through winding 32 of current transformer 28 and the collector to emitter path of transistor 20 to common. In this situation, the polarity of the voltages at the dot terminals of the windings of current transformer 28 is positive. Consequently, effectively, there is a positive feedback to the base 26 of transistor 20 enhancing its conductivity and correspondingly a negative level at base 46 of transistor 40 driving it further into nonconductivity. It is seen that, in this situation, the drive current for base 26 is only minimally supplied by the output of gating source 36, i.e., just sufficient to initiate conduction therein, the main portion of the drive current for base 26 being provided through winding 30 of current transformer 28. The turns ratio between windings 32 and 30 of current transformer 28 is chosen such that it is substantially equal to the desired current transfer ratio between windings 32 and 30 at the highest peak current.

Now, when the next half cycle of output is produced from gating source 36 to drive transistor 40 into conductivity, simultaneously a gating pulse is applied to the gate electrode of silicon controlled rectifier 68 through resistor 78 and half wave rectifying diode 76 whereby silicon controlled rectifier 68 is rendered conductive to bypass the drive current still appearing in winding 30 to common. At this same time, the current supply to base 46 of transistor 40 from gating source 36 is reinforced by the current appearing in winding 52 of current transformer 28 by regenerative action. Thereafter, current through transistor 40 rapidly builds up while concurrently transistor 20 is rapidly biased into nonconductivity.

In the event that load 18 is of the lagging power factor type, i.e., inductive, at the time that transistor 40 is rendered conductive, pumpback diode 54 provides a path for lagging load current to be returned to the potential source.

Figure 2A:
Figure 2B:
Figure 2C:
Figure 2D:
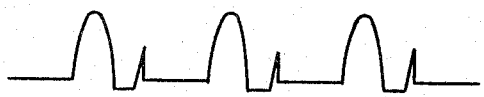

In FIGS. 2A and 2B there are shown the base and collector currents respectively of a transistor with no load in the circuit. FIGS. 2C and 2D show the base and collector currents respectively of a transistor with no load in the circuit and with a low pass filter connected to the output of transformer 12, low pass filter 88 may be included in the circuit intermediate output transformer 12 and load 18 to remove high percentage harmonics such as triplet harmonics, such filter suitably being of the type having a series connected inductor or a series combination of an inductor and a capacitor and a parallel connected capacitor. In FIGS. 2C and 2D, the similarity between the base and collector waveforms is to be noted, thus showing that base current need only be supplied when needed to produce the desired output waveform.

Figure 3:
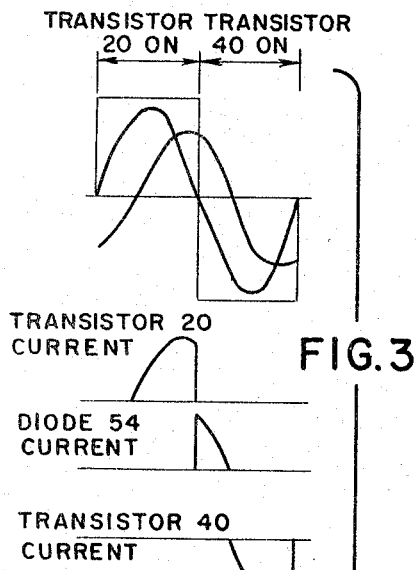
FIG. 3 is a timing diagram of the waveforms produced in the circuit of FIG. 1 when the load is of the lagging power factor type.
Figure 4:
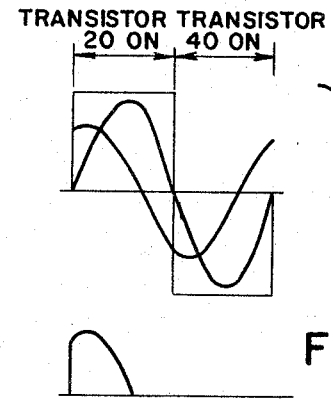
FIG. 4 is a timing diagram of the waveforms produced in the circuit of FIG. 1 when the load is of the leading power factor type.

In FIG. 3, there are shown the relations between voltages and currents for a center tapped inverter having a lagging power factor load and FIG. 4 shows the relations between voltages and currents for the center tapped inverter having a leading power factor load. In these figures, it is seen that with the circuit of FIG. 1, where the load is of the lagging power factor type, commutation is insured. However, where the load is of the leading power factor type, assuming that transistor 20 is conductive, the current through transistor 20 must reverse and flow through pumpback diode 34 late in the half cycle of output of gating source 36. Zero current in collector 24 results in low current in base 26 and low base voltage. Since the voltage at base 46 is equal and opposite to the voltage at base 26, the nonconductive biasing potential for transistor 40 is greatly reduced in the low current portions of a half cycle. Also, the collector current in transistor 20 must actually reverse and reach a small negative value in order to produce a small forward voltage on pumpback diode 34. With such reverse current, current is produced in the base 46 of transistor 40 tending to render transistor 40 conductive with a possible commutation failure as a result. It is, of course, to be emphasized that such commutation failure can only occur with leading current in the circuit of FIG. 1 since, with lagging current, there is never a current reversal on the conductive side of the inverter but rather a current transfer from one transistor to the pumpback diode for the opposite transistor.

Figure 5:
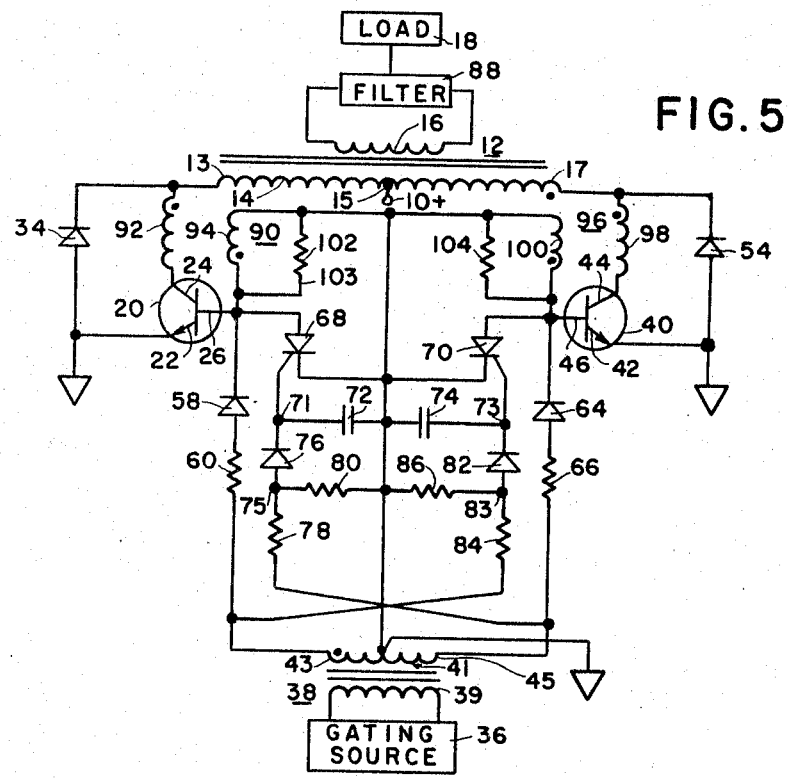
FIGS. 5 and 6 are schematic diagrams of a static inverter similar to that of FIG. 1.

In FIG. 5, there is shown a circuit constructed in accordance with the principles of the invention wherein proper commutation is assured whether the load is of the leading or the lagging power factor type.

The essential difference between the circuits of FIGS. 1 and 5 respectively is that separate current transformers 90 and 96 are utilized for each side of the circuit of FIG. 5, rather than the single current transformer 28 utilized in the circuit of FIG. 1. Also, the parallel combinations 55 and 61 of the circuit of FIG. 1 are suitably omitted in the circuit of FIG. 2 and resistors 102 and 104 connected respectively between bases 26 and 46 and common are included. Since the circuits, FIGS. 1 and 5 are essentially similar, the same designating numerals have been utilized for the corresponding components therein.

In the circuit of FIG. 5, the current transformer 90 comprises a winding 92 connected between terminal 13 and collector 24 and a winding 94 connected between common and base 26. Current transformer 96 comprises a winding 98 connected between collector 44 and terminal 17 and a winding 100 connected between common and base 46.

In the operation of the circuit of FIG. 5, the output of gating source 36 plus the regenerative feedback action of a current transformer causes a transistor to conduct. The circuit of FIG. 5 has two distinct modes of commutation, one for a leading power factor load and one for a lagging power factor load.

With regard to the mode of commutation for a leading power factor load, let it be assumed that transistor 20 has been conducting and the time has been reached in that portion of the half cycle of output from gating source 36 when it is necessary for load current to reverse in transistor 20. At this time the current in transistor 20 decreases, goes slightly negative and then flows back to primary winding, i.e., the source, through diode 34. The current and voltage at base 26 essentially follows the same course and the flux built up in the core of current transformer 90 is proportional to the time integral of the base voltage. The flux in the core of current transformer 90 decays with a time constant determined by the value of resistor 102 and the magnetizing inductance of current transformer 90. Such flux decay produces a current which flows from resistor 102 into the polarity dot end of winding 94 which causes the voltage at terminal 103 of resistor 102 to be negative with respect to common. If this time constant is substantially longer than the time of a half cycle of output from gating source 36, then terminal 103 of resistor 102 will remain at this negative potential with respect to common until transistor 20 is again rendered conductive. During the remainder of this conductive half cycle of transistor 20, the potential at base 26 is negative thereby maintaining transistor 20 nonconductive. This latter condition is a desired one since load current accordingly flows only in diode 34.

During the next half cycle, transistor 20 has to be biased so as to be nonconductive. Since diode 58 prevents the negative half cycle of output from gating source 36 from being applied to base 26, the bias in this situation for base 26 to maintain transistor 20 nonconductive is provided by the voltage drop produced in resistor 102 by the flux decay in current transformer 90. Consequently, transistor 20 is maintained nonconductive for the negative half cycle of output from gating source 36 (at terminal 43). Now, when the time is reached for transistor 20 to again be conductive at the beginning of the next positive half cycle of output from gating source 36, the voltage for base 26 is determined by resistor 60, resistor 102 and the voltage from gating source 36. Transistor 20 consequently starts to conduct and its drive is then supplied regeneratively through current transformer 90. It is, of course, realized that rather than utilize resistor 102 to provide the potential for biasing transistor 20 into nonconductivity, a separate reset voltage may be utilized. For example, diodes 58 and 64 could be omitted. In such arrangement, secondary winding 41 would effect the resetting transistor 20 but there might be introduced some further circuit losses.

Considering the operation of the circuit of FIG. 5 when load 18 is of the lagging power factor type, let it be assumed that it is at that time when transistor 20 has been conductive and the half cycle of conductivity of transistor 40 is about to start. At such time, a substantial positive load current is flowing in transistor 20, current transformer 90 and output transformer 12. When the drive voltage from source 36 reverses, base drive is supplied to transistor 40 and silicon controlled rectifier 68 is rendered conductive by the positive voltage appearing at terminal 45 of secondary winding 41 of transformer 38. In this situation, similar to the operation of the circuit of FIG. 1, the current in winding 94 of current transformer 90 is bypassed to common by conducting silicon controlled rectifier 68 causing the drive for transistor 20 to collapse. The decaying flux linkages in transformer 90 causes load current to flow through pumpback diode 54 back to the potential source. The decaying flux linkages in current transformer 90 produces current in the direction to render silicon controlled rectifier 68 nonconductive and to provide bias to maintain transistor 20 nonconductive for the next half cycle of output from gating source 36.

From the foregoing, it is seen that the circuits of FIGS. 1 and 5 are inverters wherein the power in the external drivers for the switching transistors in the inverter may be greatly reduced and also wherein the power loss in the switching transistor base electrodes may be substantially reduced. The circuit of FIG. 1 is advantageously utilized where the load is resistive or of the lagging power factor type. The circuit of FIG. 5 is advantageously utilized with loads of any power factor type.

Figure 6:
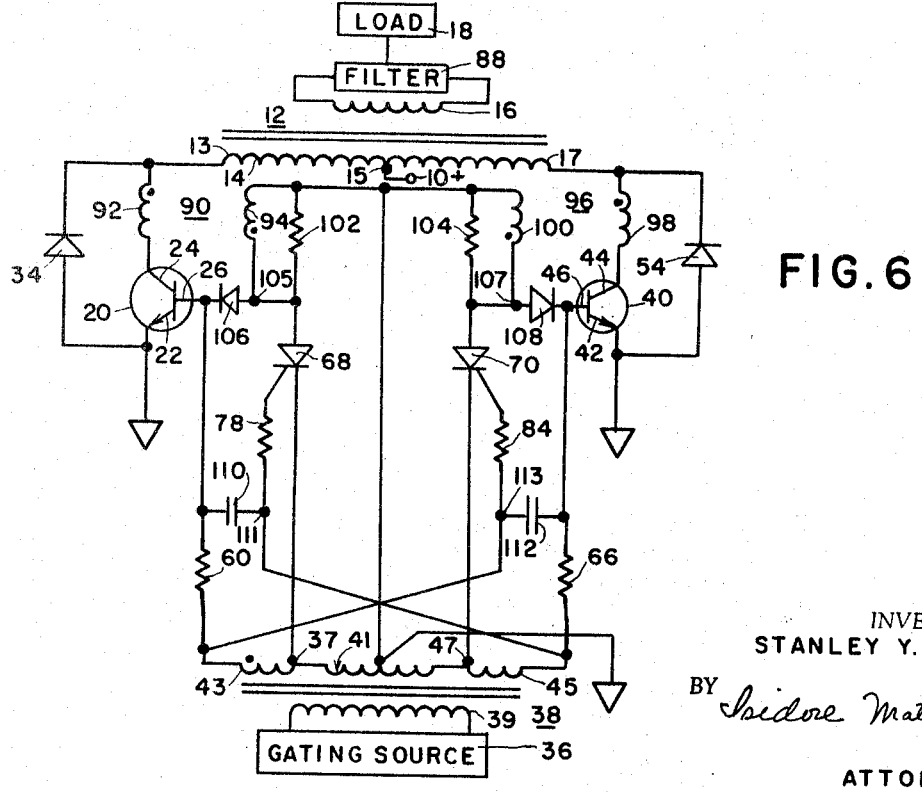

In the circuit of FIG. 6, the switching transistor 20 has its emitter 22 directly connected to common and its collector 24 connected to terminal 13 of the primary winding 17 of an output transformer 12 through winding 92 of current transformer 90. The base 26 of transistor 20 is connected to common through the cathode to anode path of a diode 106 and winding 94 of current transformer 90, the junction 105 of diode 106 and winding 94 being connected to common through resistor 102. Base 26 is also connected to terminal 43 of secondary winding 41 of output transformer 38 of gating source 36 through resistor 60. The anode to cathode path of silicon controlled rectifier 68 is connected between junction 105 and a point 37 on secondary winding 41, the gate electrode of silicon controlled rectifier 68 being connected to terminal 45 of secondary winding 41 through resistor 78. The cathode to anode path of a diode 34 is connected between terminal 13 of primary winding 14 and common.

Similarly, the other switching transistor 40 of the inverter has its emitter 42 directly connected to common, its collector 44 connected to terminal 17 of primary winding 14 through winding 98 of current transformer 96, base 46 of transistor 40 being connected to common through the cathode to anode path of a diode 108 and winding 100 of current transformer 96, the junction 107 of diode 108 and winding 100 being connected to common through resistor 104. Base 46 is also connected to terminal 45 of secondary winding 41 through resistor 66. The anode to cathode path of silicon controlled rectifier 70 is connected between junction 107 and an intermediate point 47 on secondary winding 41, the gate electrode of silicon controlled rectifier 70 being connected to terminal 43 of secondary winding 41 through resistor 84. The cathode to anode path of a diode 54 is connected between terminal 17 and common. A capacitor 110 is connected between the junction 111 of resistor 78 and terminal 45, and base 26, and a capacitor 112 is connected between base 46 and the junction 113 of resistor 84 and terminal 43.

In considering the operation of the circuit of FIG. 6, let it be assumed that transistor 20 is conducting heavily. At the moment that the negative half cycle of output from gating source 36 appears at terminal 43 of secondary winding 41, this negative voltage is supplied to base 26 of transistor 20 through resistor 60 and silicon controlled rectifier 68 is gated into conductivity by the positive voltage appearing at terminal 45 which is applied to its gate electrode through resistor 78. At this time, the voltage at point 37 on secondary winding 41 to which the cathode of silicon controlled rectifier 68 is connected is below common potential. Consequently, it is seen that an easier bypass path for current flowing in winding 94 is provided through silicon controlled rectifier 68 then through diode 106 and the base to emitter diode of transistor 20. Thus, the still existing base drive current for transistor 20 is diverted therefrom and the back biasing provided by the negative voltage at terminal 43 and applied to base 26 through resistor 60 is effective in rendering transistor 20 nonconductive.

With reference to the function of capacitors 110 and 112, when terminal 43 goes negative, terminal 45 goes positive to render silicon controlled rectifier 68 conductive and substantially instantaneously render transistor 20 nonconductive and to cause inductive current to flow in diode 54. The going positive of terminal 45 also tends to raise the voltage at base 46 above common potential. Transistor 40, however, cannot actually conduct until the charge on capacitor 113 is reversed, such reversal requiring a few microseconds. If such delay action were not provided, transistor 40 would conduct before the stored charged carriers in transistor 20 had recombined. Such premature conduction of transistor 40 would result in useless losses.

In the operation of the circuit of FIG. 6 when load 18 is of the leading power factor type, let it be assumed that transistor 20 is conducting and the point of time has been reached when load current has to reverse direction in transistor 20. In this situation, the current through transistor 20 decreases to a point where it goes slightly negative and thereupon flows through diode 34. Thus, the voltage at collector 24 goes slightly negative with respect to the common potential at emitter 22 and even though transistor 20 remains forward biased through resistor 60 for the remainder of its conducting half cycle, almost all of the load current flows in diode 34. The flux linkages which were built up in current transformer 90 during the forward conduction of transistor 20 now start to decay whereby a negative voltage is produced at the dot terminals of the windings of current transformer 90, the negative voltage in winding 94 being isolated by diode 106 whereby it does not affect transistor 20.

At the beginning of the next half cycle, i.e., the nonconducting half cycle for transistor 20, transistor 20 is biased to cut off by a negative voltage applied to base 26 through resistor 60 from terminal 43 of winding 41. Also, the resetting of the core of current transformer 90 is completed through diode 106 and resistor 60.

In the operation of the circuit of FIG. 6 when load 18 is of the lagging power factor type, let it again be assumed that transistor 20 is conducting and that the point in time has been reached where transistor 40 is to be switched into conductivity and transistor 20 is to be rendered nonconductive. At this time, a heavy positive load current is flowing in transistor 20, current transformer 90 and output transformer 12. When the drive voltage in the output of gating source 36 reverses, positive base drive is supplied to transistor 40 and silicon controlled rectifier 68 is rendered conductive. Thereupon, the current in winding 94 of current transformer 90 is diverted through silicon controlled rectifier 68 to point 37 causing the collapsing of the base drive for transistor 20. Thereafter, the reverse bias for transistor 20 is maintained by the negative voltage at terminal 43 applied to base 26 through resistor 60. The decaying flux linkages in transformer 12 causes the transfer of load current to diode 54 and base drive for transistor 40 is supplied to base 46 from terminal 45 of secondary winding 41 through resistor 66. At the time of this load current reversal whereby transistor 40 is rendered conductive, collector current flows therein and proportional base current is provided therefor by winding 100 of current transformer 96. It is thus seen in the circuit of FIG. 6 that with the arrangement of diodes 106 and 108 in series arrangement with current transformer windings 94 and 100 respectively, commutation is assured since drive current in a current transformer winding at the time of commutation is bypassed through a silicon controlled rectifier and the reverse biasing voltage can be applied to the transistor to be rendered nonconductive at the time that the drive voltage from gating source 36 is switched from positive to negative.

In FIG. 7, there is shown a bridge inverter constructed in accordance with the principles of the invention and utilizing transistors as the power switching elements therein. In this circuit, pairs of "diagonally" disposed transistors 120 and 180, and 140 and 160 respectively are concurrently conductive to develop opposite polarity of half cycles of output on the primary winding 200 of the output transformer 200. In the circuit, the series arrangement of the emitter 122 to collector 124 path of transistor 126, a winding 130 of a current transformer 128, the emitter 162 to collector 164 path of transistor 160 and a winding 170 of a current transformer 168 is connected across a unidirectional potential source 118, shown as a battery, and whose output is to be converted to an alternating current potential. The cathode to anode path of a pumpback diode 132 is connected between the positive terminal 119 of source 118 and the junction 131 of winding 130 and emitter 162. The cathode to anode path of a pumpback diode 172 is connected between junction 131 and common.

The series arrangement of the anode to cathode path of a silicon controlled rectifier 121 and the parallel combination of oppositely poled diodes 123 and 125, is connected between positive terminal 119 and the base 126 of transistor 120. The series arrangement of a secondary winding 216 of the output transformer 212 of a gating source 210 and a resistor 127 is connected between emitter 122 and the gate electrode of silicon controlled rectifier 121, a resistor 133 being provided between base 126 and the junction 129 of secondary winding 216 and resistor 127. A winding 132 of current transformer 128 is provided between positive terminal 119 and the cathode of silicon controlled rectifier 121.

The "lower" half of the "left" side of the bridge circuit of FIG. 7 is alike in structure to the "upper" half as described. In this connection, the secondary winding 218 of transformer 212 in circuit with the emitter 162 of transistor 160 and the gate electrode of silicon controlled rectifier 161 is oppositely poled from that of secondary winding 216.

The "right" half of the bridge circuit of FIG. 7 is constructed the same as the left half. The secondary windings therein of the gating source may be windings of transformer 212 whereby the outputs appearing thereon are exactly phased with the gating voltages in windings 216 and 218, i.e., the voltage appearing in windings 216 and 222 are in phase and the voltages appearing in windings 218 and 220 are in phase. Alternatively, windings 220 and 222 may have therein voltages which are displaced in phase with respect to the output of gating source 210. Such phase displacement may be of a fixed value as provided by a fixed phase shift device 224 whereby the output of the circuit appearing in transformer 200 may be a quasi-square wave having a fixed dwell angle or the phase displacement may be variable, for example, in accordance with the deviation of the output voltage of the circuit from a desired voltage.

In considering the operation of the circuit of FIG. 7, let it be assumed that transistor 120 is rendered conductive, by the appearance of a positive half cycle of output from source 210 in winding 216 whereby transformer action is provided in current transformer 128 to cause a negative voltage to be regeneratively applied to base 126 through winding 132 and diode 123. If it is desired to produce a pure square wave in output transformer 200 then transistor 180 is simultaneously rendered conductive whereby current flows through transistor 120, winding 130, winding 202, transistor 180 and the current transformer winding in its collector circuit to common. If the drive for transistor 180 is phase shifted with respect to the drive for transistor 120 then, of course, transistor 180 will be rendered conductive, after transistor 120 is rendered conductive in accordance with the phase displacement. In such latter situation, the output appearing in transformer 202 will have a pulse width equal only to the time of concurrent conductivity of transistors 120 and 180.

Now, when the next, i.e., the negative half cycle of output is produced from gating source 210, transistor 160 is rendered conductive and silicon controlled rectifier 121 is gated into conductivity to provide a bypass path for the drive current in winding 132. Transistor 160 which is rendered conductive at this time is further driven into conductivity by the regenerative action of current transformer 168 and the state is rapidly achieved where transistor 120 is at cutoff and transistor 160 is conducting fully. The same events obtain with regard to transistors 140 and 180. If transistors 140 and 180 are being driven by the output of gating source 210 through transformer 212, then at this time transistors 120 and 180 are simultaneously rendered nonconductive while transistors 140 and 160 are simultaneously rendered conductive. In the event that transistors 140 and 180 are being driven by the output of phase shifter 224, then, of course, the rendering conductive and nonconductive of transistors 140 and 180 respectively occurs at a time determined by the degree of phase shift.

Let it now be assumed that load 208 is of the leading power factor type and also let it be assumed that it is at the instant of the beginning of the conducting half cycle for transistor 120. At this instant, the polarity dot end of winding 216 goes positive providing some base current through resistor 133 and rendering transistor 120 slightly conductive. The resulting collector current in winding 130 causes a proportional current to flow in the base circuit through winding 132 and diode 123. This resulting positive feedback action insures that transistor 120 is held substantially at saturation conduction for any current up to its maximum rating and it presents a substantially very low saturation resistance to the circuit. The small amount of reactive load current which may be present which has been flowing through diode 172 into the polarity dot end of primary winding 202 just prior to this instant, now transfers as active current to transistor 120. As time proceeds, such active current progressively decreases and reverses direction becoming reactive current. Diode 125 at this point functions to substantially minimize the amount of reactive current which passes through transistor 120 by reverse transistor action and thereby correspondingly minimizes transistor loss. It is to be realized that any reactive current flowing through winding 130 in the direction from junction 131 to its dot end would result in current to base 126 of transistor 120 which would tend to bias it in the nonconductive direction. At the end of the conducting half cycle of transistor 120, the voltages in transformer 212 reverse in polarity and transistor 160 is rendered conductive through secondary winding 218 and resistor 219. At the same time, transformer 128 is reset through resistor 133 and diode 125, and transistor 120 is biased to cutoff by winding 216 and resistor 133.

In the situation where load 208 is of the lagging power factor type, at the beginning of the conducting half cycle, for example, for transistor 120, reactive current transfers to diode 132 at the instant that transistor 120 is rendered conductive and flows principally therethrough rather than transistor 120. Transistor 120 is biased in the conductive direction during this half cycle by winding 216 through resistor 133 and as the reactive current flows through the zero crossover point and increases as active current, it transfers to transistor 120 thereby providing proportional base drive current for transistor 120 through winding 132. At the end of the conducting half cycle for transistor 120, considerable active current is flowing through transistor 120 and current transformer 128. When the voltage on secondary winding 216 reverses to render silicon controlled rectifier 121 conductive, the base drive current existing in winding 132 is diverted through silicon controlled rectifier 121 and away from the path comprising diode 123 and the base to emitter diode of transistor 120. Thus, transistor 120 loses current drive and secondary winding 216 provides a reverse bias therefor so that load current flow is interrupted in transistor 120. The current which is at this time flowing into the dot terminal of primary winding 202, transfers as reactive current to pumpback diode 172. During the nonconducting half cycle of transistor 120, it is biased to cutoff by secondary winding 216 and current transformer 128 is reset through resistor 133 and diode 123.

While there have been shown particular embodiments of this invention, it will, of course, be understood that it is not wished to be limited thereto since modifications may be made both in the circuit arrangements and in the instrumentalities employed, and it is contemplated in the appended claims to cover any such modifications as fall within the true spirit and scope of the invention.

What is claimed as new and desired to be secured by Letters Patent of the United States is:

1. A circuit for converting the output of a unidirectional potential source to an alternating current potential comprising a current transformer comprising a plurality of transformer coupled windings, a first series arrangement of a first of said windings and a first semiconductor device connected across said source, a second series arrangement of a second of said windings and a second semiconductor device connected across said source, a third of said windings connected in the input of said first transistor, a fourth of said windings connected in the input of said second semiconductor device, rectangular wave generating means in circuit with the respective inputs of said semiconductor devices for alternately supplying a small portion of drive to said semiconductor devices during successive half cycles of output from said generating means, said windings being so poled as to regeneratively provide current drive to a semiconductor device rendered conductive by said generating means, means responsive to said generating means for effectively halting regenerative action of said third winding when said second semiconductor device is rendered conductive and for effectively halting regenerative action of said fourth winding when said first semiconductor device is rendered conductive, output terminals, and output coupling means in circuit with said first and second semiconductor devices for coupling said alternating potential to said output terminals.

2. A circuit for converting the output of a unidirectional potential source to an alternating current potential comprising a current transformer having a plurality of transformer coupled windings, a first series arrangement of a first of said windings and a first transistor connected across said source, a second series arrangement of a second of said windings and a second transistor connected across said source, a third of said windings connected in the input to said first transistor, a fourth of said windings connected in the input of said second transistor, rectangular wave generating means in circuit with the respective inputs of said transistors for alternately supplying a small portion of drive to said transistors during successive half cycles of output from said generating means, said windings being so poled as to regeneratively provide current drive to a transistor rendered conductive by said generating means, a first gate controlled rectifier in circuit with the input of said first transistor, said third winding and said generating means which is gated into conductivity upon the initially rendering conductive of said second transistor a second gate controlled rectifier in circuit with the input of said second transistor, said fourth winding and said generating means which is gated into conductivity upon the initially rendering conductive of said first transistor, output terminals, and output coupling means in circuit with said first and second transistors for coupling said alternating potential to said output terminals.

3. A circuit for converting the output of a unidirectional potential source to an alternating current potential comprising a current transformer comprising of plurality of transformer coupled windings, a first series arrangement of a first of said windings and a first transistor connected across said source, a second series arrangement of a second of said windings and a second transistor connected across said source, a third of said windings connected in the input of said first transistor, a fourth of said windings connected in the input of said second transistor, rectangular wave generating means in circuit with the respective inputs of said transistors for alternately supplying a small portion of drive to said transistors during successive half cycles of output from said generating means, said windings being so poled as to regeneratively provide current drive to a transistor rendered conductive by said generating means, a first gate controlled rectifier in circuit with the input of said first transistor, said third winding and said generating means which is gated into conductivity upon the initially rendering conductive of said second transistor, a second gate controlled rectifier in circuit with the input of said second transistor, said fourth winding and said generating means which is gated into conductivity upon the initially rendering conductive of said first transistor, first and second pumpback diodes respectively connected across said first and second series arrangements, output terminals, and output coupling means in circuit with said first and second transistors for coupling said alternating potential to said output terminals.

4. A circuit for converting the output of a unidirectional potential source to an alternating current potential comprising a current transformer comprising a plurality of transformer coupled windings, an output transformer having a primary winding and a secondary winding, a first series arrangement of one half of said primary winding, a first of said current transformer windings and a first transistor connected across said source, a second series arrangement of the other half of said primary winding, a second of said current transformer windings and a second transistor connected across said source, a load connected across said secondary winding, a third of said current transformer windings connected in the input of said first transistor, a fourth of said current transformer windings connected in the input of said second transistor, rectangular wave generating means in circuit with the respective inputs of said transistors for alternately supplying a small portion of drive to said transistors during successive half cycles of output from said generating means, said current transformer windings being so poled as to regeneratively provide current drive to a transistor rendered conductive by said generating means, a first gate controlled rectifier in circuit with the input of said first transistor, said third winding and said generating means which is gated into conductivity upon the initially rendering conductive of said second transistor, a second gate controlled rectifier in circuit with the input of said second transistor, said fourth winding and said generating means which is gated into conductivity upon the initially rendering conductive of said first transistor, and first and second pumpback diodes respectively connected across said first and second series arrangements.

5. A circuit as defined in claim 4 and further including a filter in circuit intermediate said secondary winding and said load.

6. A circuit for converting the output of a unidirectional potential source to an alternating current output comprising first and second current transformers, each comprising a plurality of transformer coupled windings, an output transformer having a primary winding and a secondary winding, a first series arrangement of one half of said primary winding, a first of said first current transformer windings and a first transistor connected across said source, a second series arrangement of the other half of said primary winding, a first of said second current transformer windings, and a second transistor connected across said source, a load connected across said secondary winding, a second of said first current transformer windings connected in the input of said first transistor, a second of said second current transformer windings connected in the input of said second transistor, rectangular wave generating means in circuit with the respective inputs of said transistors for alternately supplying a small portion of drive to said transistors during successive half cycles of output from said generating means, said current transformer windings being so poled as to regeneratively provide current drive to a transistor rendered conductive by said generating means, a first gate controlled rectifier in circuit with the input of said first transistor, said second winding of said first current transformer and said generating means which is gated into conductivity upon the initially rendering conductive of said second transistor, a second gate controlled rectifier in circuit with the input of said second transistor, said second winding of said second current transformer and said generating means which is gated into conductivity upon the initially rendering conductive of said first transistor, first and second pumpback diodes respectively connected across said first and second series arrangement, and means in circuit with said first and second current transformers for respectively resetting said last-named transformers.

7. A circuit as defined in claim 6 and further including a low-pass filter in circuit intermediate said secondary winding and said load.

8. A circuit for converting the output of a unidirectional potential source having a positive and negative terminal to an alternating current output comprising first and second current transformers, each comprising a plurality of transformer coupled windings, an output transformer having a primary winding and a secondary winding, the midpoint of said primary winding being connected to said positive terminal, a first series arrangement of one half of said primary winding, a first of said first current transformer windings and a first transistor connected across said source, a second series arrangement of the other half of said primary winding, a first of said second current transformer windings and a second transistor connected across said source, a load connected across said secondary winding, a first series combination of a second of said first current transformer windings and a first forward poled diode connected between said negative terminal and the input of said first transistor, a second series combination of a second of said second current transformer windings and a second forward poled diode connected between said negative terminal and the input of said second transistor, rectangular wave generating means having an output transformer comprising a primary and a secondary winding, said last-named secondary winding being in circuit with the inputs of said first and second transistors respectively for alternately supplying a small portion of drive to said transistors during successive half cycles of output from said generating means, said current transformer windings being so poled as to regeneratively provide current drive to a transistor rendered conductive by said generating means, a first gate controlled rectifier in circuit with said second winding of said first current transformer and a first intermediate point on said generating means secondary winding which is gated into conductivity upon the initially rendering conductive of said second transistor, a second gate controlled rectifier in circuit with said second winding of said second current transformer and a second intermediate point on said generating means secondary winding which is gated into conductivity upon the initially rendering conductive of said first transistor, first and second pumpback diodes respectively connected across said first and second series combination, and means in circuit with said first and second current transformers for respectively resetting said last-named transformers.

9. A circuit as defined in claim 8 and further including a filter in circuit intermediate said output secondary winding and said load.

10. A circuit as defined in claim 9 and further including first and second capacitors in circuit with said first and second transistors and said generating means for delaying the initiation of conduction in a transistor.

11. A circuit for converting the output of a unidirectional potential source having a positive and negative terminal to an alternating current output comprising first, second, third and fourth current transformers, each comprising a plurality of transformer coupled windings, a first series arrangement comprising a first series combination of a first transistor and a first winding of said first current transformer and a second series combination of a second transistor and a first winding of said second current transformer connected across said source, a second series arrangement comprising a third series combination comprising a third transistor and a first winding of said third current transformer and a fourth series combination of a fourth transistor and a first winding of said fourth current transformer connected across said source, an output transformer comprising a primary winding connected between first and second junctions of said first and second, and said third and fourth series combinations respectively, second windings of said first, second, third and fourth current transformers connected in the inputs of said first, second, third and fourth transistors respectively, first, second, third and fourth gate controlled rectifiers each having an anode, a cathode and a gate electrode, said first and third gate controlled rectifiers being connected in their anode to cathode paths between said positive terminal and the inputs of said first and third transistors respectively, said second and fourth gate controlled rectifiers being connected between said first and second junctions and the inputs to said second and fourth transistors respectively, rectangular wave generating means having a primary winding and a plurality of secondary windings, first, second, third and fourth of said last-named windings being in circuit with said gate electrodes and said transistors respectively for alternately supplying a small portion of drive to said first and fourth, and said second and third transistors respectively during successive half cycles of output from said generating means, said current transformer windings being so poled as to regeneratively provide current drive to a transistor rendered conductive by said generating means, said first and fourth gate controlled rectifiers being gated into conductivity upon the initially rendering conductive of said second and third transistors, said second and third gate controlled rectifiers being gated into conductivity upon the initially rendering conductive of said first and fourth transistors, first, second, third and fourth pumpback diodes respectively connected across said first, second, third and fourth series combination and means in circuit with said first, second, third and fourth current transformers for resetting said last-named transformers.

12. A circuit as defined in claim 11 wherein there are further included phase shift means in circuit with said generating means and said third and fourth transistors and gate controlled rectifiers.

References Cited by the Examiner

UNITED STATES PATENTS 3,078,380   2/1963   Ingman.

JOHN F. COUCH, *Primary Examiner.*

W. M. SHOOP, *Assistant Examiner.*